United States Patent [19]

Saho et al.

[11] Patent Number: 5,083,445
[45] Date of Patent: Jan. 28, 1992

[54] CRYOPUMP

[75] Inventors: Norihide Saho, Tsuchiura; Taisei Uede; Yoichi Ono, both of Hitachi; Hisanao Ogata; Takeo Nemoto, both of Ibaraki, all of Japan

[73] Assignee: Hitachi, Ltd., Tokyo, Japan

[21] Appl. No.: 466,633

[22] Filed: Jan. 17, 1990

[30] Foreign Application Priority Data

Jan. 20, 1989 [JP] Japan .................................. 1-9757
Jan. 20, 1989 [JP] Japan .................................. 1-9758

[51] Int. Cl.$^5$ ............................................. B01D 8/00
[52] U.S. Cl. .................................... 62/55.5; 55/269; 417/901
[58] Field of Search ................ 62/55.5, 100, 268; 55/269; 417/901

[56] References Cited

U.S. PATENT DOCUMENTS

| 4,214,853 | 7/1980 | Mahl ................... | 62/55.5 |
| 4,341,079 | 7/1982 | Bonn ................... | 62/55.5 |
| 4,406,130 | 9/1983 | Hemmerich ......... | 62/55.5 |

FOREIGN PATENT DOCUMENTS

| 2516286 | 10/1976 | Fed. Rep. of Germany . |
| 61-169682 | 1/1985 | Japan . |
| 61-123775 | 6/1986 | Japan . |
| 61-123776 | 6/1986 | Japan . |

OTHER PUBLICATIONS

B. D. Power: "High Vacuum Pumping Equipment", 1966, pp. 229-249, Chapman and Hall Ltd., London, GB, p. 246, paragraphs 2-3, FIGS. 7.14a, 7.14b.
Patent Abstracts of Japan, vol. 9, No. 326 (M-441( [2049], 21st Dec. 1985; & JP-A-60 159 383 (Yasushi Iwasa) 20-08-1985.
Patent Abstracts of Japan, vol. 9, No. 220 (E-341) [1943], 6th Sep. 1985; & JP-A-60 79 183 (Yoshinao Sanada) 04-05-1985.

*Primary Examiner*—Ronald C. Capossela
*Attorney, Agent, or Firm*—Antonelli, Terry, Stout & Kraus

[57] ABSTRACT

A cryopump for effecting a cooling operation by a freezing medium such as liquid helium. A plurality of radiation-heat shield plates for protecting cryopanels against an external heat radiation are provided in opposed relation to a gas inlet of the cryopump. Particularly, a plurality of groups of such radiation-heat shield plates are provided in such a manner that the radiation-heat shield plates of each group are arranged in a multi-stage manner in registry with one another in the direction of the depth of the cryopump and are disposed in parallel relation to one another. Each of the cryopanels is disposed adjacent to a rear surface of respective radiation-heat shield plates facing away from the gas inlet. With this construction, the gas molecules reflected by those radiation-heat shield plates and by a rear wall of the cryopump, are less liable to reach the gas inlet, and tend to be condensed at an increased rate on those cryopanels.

24 Claims, 6 Drawing Sheets

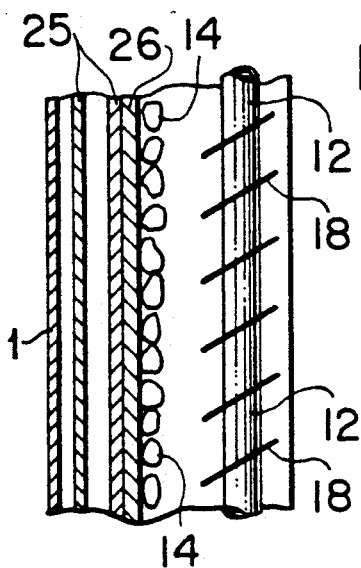
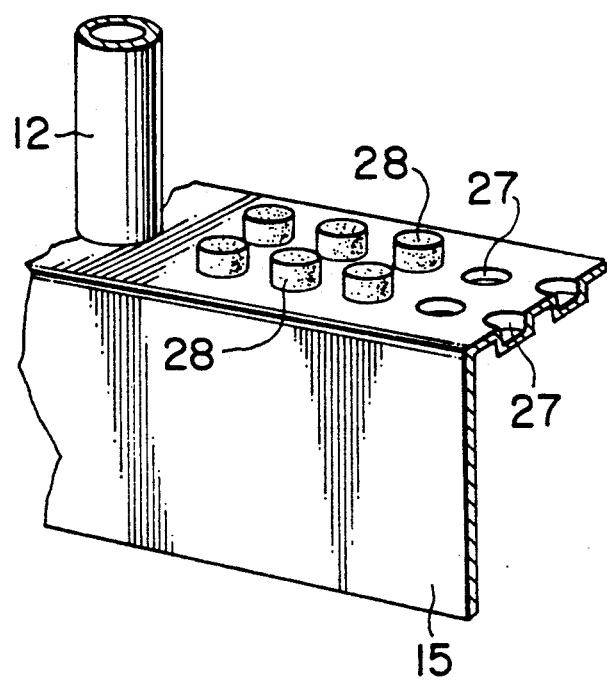
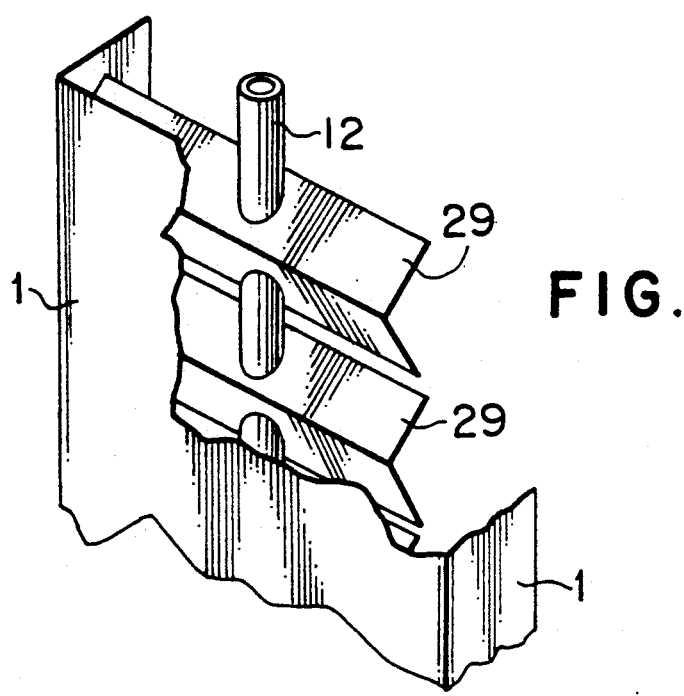
FIG. 14
FIG. 15
FIG. 16

CRYOPUMP

BACKGROUND OF THE INVENTION

This invention relates to a cryopump in which the molecules of gas, having a boiling point higher than the temperature of a cryopanel cooled to extremely low temperatures, are condensed and adsorbed on the surface of the cryopanel, thereby exhausting a large amount of the gas at high speed.

In a conventional apparatus as disclosed in Japanese Patent Unexamined Publication No. 61-169682, a plurality of cryopanels cooled to extremely low temperatures by liquid helium or the like are disposed perpendicularly to a plane of a gas inlet and are spaced a predetermined distance from one another, with each of the cryopanels having a single flat surface. Front shield plates cooled by liquid nitrogen are provided at a part of the gas inlet so that the cryopanels will not be heated by the radiation heat applied from a high-temperature portion in the vicinity of the gas inlet. Louver blinds cooled by liquid nitrogen are provided at the sides of the cryopanels. The gas molecules pass through the gaps in the louver blinds and are condensed and adsorbed on the cryopanels. A rear shield plate cooled by liquid nitrogen is also provided at the rear side of the cryopanels.

The surfaces of the front shield plates, the rear shield plate and the louver blinds are treated to have a black color so that these surfaces can adsorb the radiation heat. External rays of light are once reflected by these shield plates, and then reach the cryopanels.

The gas molecules to be exhausted flow into the cryopump via inlets each formed between two adjacent front shield plates. The gas molecules impinge on the louver blinds or the rear shield plate once or several times, and some of the gas molecules flow out of the inlet whereas other gas molecules reach the cryopanels and are condensed and adsorbed thereon. If the rate or proportion of such condensed and adsorbed gas molecules is increased, the exhaust speed of the cryopump can be increased.

In the conventional cryopump, the louver blind surface (surface A) is disposed at a certain angle $\alpha$ with respect to the plane of a gas inlet and a line normal to the louver blind surface is directed toward the gas inlet. It is most probable that the reflected gas molecules advance in the direction normal to the impinging surface according to the cosine law. Therefore, after the gas molecules impinge on and are reflected by the surface A of the louver blinds, the number of those gas molecules which move back toward the gas inlet is larger than the number of those gas molecules which are directed toward the cryopanel. Particularly, those gas molecules, impinging on the surface A of the louver blinds disposed near the gas inlet, flow back through the gas inlet at a higher rate after they are reflected by the surface A. Thus, the conventional cryopump suffers from the problem that the rate or proportion of the gas molecules condensed and absorbed on the cryopanels, namely, the molecule arresting rate is small, which results in failure to increase the exhaust speed.

Further, in the conventional louver blind-type cryopump, since the cryopanel has a single flat panel surface, gases of a low-boiling point, such as helium gas, which can not be condensed and adsorbed on such a single panel surface, can not be exhausted.

SUMMARY OF THE INVENTION

It is therefore an object of this invention to provide a cryopump which enhances the passing probability of the gas molecules to thereby improve the exhaust speed, and is capable of exhausting gaseous helium at the same time.

A cryopump according to the present invention comprises cryopanels cooled to extremely low temperatures and serving to cause gas molecules to be condensed and adsorbed thereon, and radiation-heat shield plates cooled to low temperatures and serving to protect the cryopanels against radiation heat from a high-temperature portion. Usually, the radiation-heat shield plates are cooled by liquid nitrogen.

In the cryopump of the present invention, a plurality of radiation-heat shield plates are provided in opposed relation to a gas inlet of the cryopump preferably in substantially parallel relation to the plane of the gas inlet). The radiation-heat shield plates are arranged into groups, so that each group of radiation-heat shield plates are arranged in a multi-stage manner in registry with one another in the direction of the depth of the cryopump so as to provide a louver-like arrangement.

Each of the cryopanels is disposed adjacent to a rear surface of respective radiation-heat shield plates facing away from the gas inlet. With this arrangement, the radiation-heat shield plate serves as a blind for protecting its mating cryopanel against the flow of the gas.

Thus, the cryopump comprises the louver blinds constituted by the radiation-heat shield plates, and the cryopanels. With this construction, the rate or efficiency of arresting the gas molecules can be enhanced.

Preferred forms of the present invention are as follows:

(1) There are provided a plurality of groups of radiation-heat shield plates, with the radiation-heat shield plates of each group being arranged in a multi-stage manner in registry with one another in a direction of the depth of the cryopump. The radiation-heat shield plates of each group have substantially the same width, and each of the radiation-heat shield plates have a shield surface disposed in substantially parallel relation to the plane of the gas inlet. Each of the cryopanels are disposed adjacent to a rear surface of respective radiation-heat shield plates facing away from the gas inlet.

(2) The radiation-heat shield plates are arranged in a multi-stage manner, with each of the radiation-heat shield plates having a shield surface disposed in substantially parallel relationship to the plane of the gas inlet. Each of the cryopanels is disposed adjacent to a rear surface of respective radiation-heat shield plates facing away from the gas inlet.

(3) There are provided a plurality of groups of radiation-heat shield plates, with the groups being spaced from one another in a direction substantially parallel to the plane of the gas inlet, with the radiation-heat shield plates of each group being arranged in a multi-stage manner in registry with one another in a direction of the depth of the cryopump. The radiation-heat shield plates of each group have substantially the same width, and each of the cryopanels is disposed adjacent to a rear surface of respective radiation-heat shield plates facing away from the gas inlet.

(4) There are provided a plurality of groups of radiation-heat shield plates, with the groups being spaced from one another in a direction substantially parallel to the plane of the gas inlet, with the radiation-heat shield plates of each group being arranged in a multi-stage manner in registry with one another. The plurality of groups of radiation-heat shield plates are mounted within a single chamber without providing any partition wall between each two adjacent ones of the groups, and each of the cryopanels is disposed adjacent to a rear surface of respective radiation-heat shield plates facing away from the gas inlet.

(5) A plurality of first radiation-heat shield plates are arranged in facing relation to said gas inlet. A first cryopanel is provided adjacent to a rear surface of each of the first radiation-heat shield plates facing away from the gas inlet. A second cryopanel is provided on a rear side of each of the first cryopanels facing away from the gas inlet, the second cryopanel being disposed substantially perpendicular to the plane of the gas inlet. A plurality of third cryopanels extend from each of the opposite sides of each of the second cryopanels, and a second radiation-heat shield plate is provided on a front side of each of the third cryopanels facing the gas inlet.

More specifically, the screen plate, which is cooled to a temperature equal to that of the cryopanel, is provided adjacent to the rear surface B of each louver cooled by liquid nitrogen. This screen plate is disposed behind the front surface A of the louver, and cannot be directly viewed from the gas inlet. This screen plate can either be thermally connected to the cryopanel or be cooled independently thereof.

By providing the screen plate adjacent to the rear surface B of each louver, the gas molecules which are reflected by the front surface A of the louver and are directed toward the rear surface B of the adjoining louver, can be all condensed and adsorbed, on the screen plate, thus enhancing the efficiency of arresting the gas molecules.

(6) In the above preferred forms (1) to (5), at least a part of the group of radiation-heat shield plates have their opposite side edge portions bent away from the gas inlet into an angle of not less than 90 degrees.

(7) In the above preferred forms (1) to (5), screen plates are provided respectively on sides of at least a part of the group of radiation-heat shield plates facing the gas inlet, with each of the screen plates being spaced apart from the cryopanel of the preceding stage closer to the gas inlet.

(8) In the above preferred forms (1) to (5), each of the cryopanel has a corrugated shape to increase the panel area.

(9) In the above preferred forms (1) to (5), each of the cryopanels comprises a pipe and a plurality of panel members.

(10) The pipe mentioned in paragraph (9) is greater in electric resistance than the panel member.

(11) In the above preferred forms (1) to (5), adsorbents are integrally connected to each of the cryopanels. Molecular sieves or activated charcoal can be suitably used as the absorbent.

It is preferred that recesses for receiving the adsorbents be formed in each of the panel members so as to prevent the adsorbents from becoming disengaged from the panel member.

A separate panel having absorbents secured thereto can be provided on a side of the cryopanel or the panel member facing its mating radiation-heat shield plate. With this construction, the panel with the absorbents can be exchanged independently.

Also, adsorbents can be thermally integrally secured to at least a part of a bent surface of the cryopanel.

(12) In the above preferred forms (1) to (5), the cryopanel comprises a cooling pipe of a great electric resistance and a group of panel segments of a small electric resistance thermally integrally connected to the cooling pipe, the panel segments being spaced apart from one another.

In this specification, the term "rear surface (surface B)" means a reverse surface opposite to a front surface (surface A) directed toward the gas inlet, and therefore the rear surface is directed toward the distal end of the cryopump chamber remote from the gas inlet.

The surfaces A of the louver blind are disposed substantially parallel to the plane of the gas inlet, and the louvers are arranged in a multi-stage manner in the direction of the depth of the cryopump. With this construction, it is more probable that the gas particles impinging on and reflected by the surface A are directed toward and impinge on the louver of the preceding stage, rather than move back toward the gas inlet, so that the gas particles are again reflected thereby and move toward the distal end of the pump. Therefore, the rate of the gas particles flowing from the pump via the gas inlet is reduced, thus enhancing the efficiency of arresting the gas particles.

Since the cryopanel is disposed on the side opposite to the surface A, the gas molecules (e.g., hydrogen gas molecules) reflected by the surface A can be condensed and adsorbed on the cryopanel. This further enhances the efficiency of arresting the gas molecules. By providing the absorbents on a part of the bent surface, helium gas can be absorbed and exhausted.

If the radiation-heat shield plates are disposed in parallel relation to the plane of the gas inlet, the gas particles are more liable to be arrested by the cryopanel of the preceding stage closer to the gas inlet since the gas particles, when reflected by the front surface of the radiation-heat shield plate, tend to be directed in a direction normal to the front surface at an increased rate.

If each group of radiation-heat shield plates of substantially the same width are arranged in registry with one another, the flow of the gas particles is not blocked by the lateral edge portions of those radiation-heat shield plates disposed rearwardly of the front radiation-heat shield plate. Therefore, the gas particles can be introduced deep into the pump.

Even if a plurality of groups of radiation-heat shield plates are used, the gas particles moving from one group can be arrested by the adjoining group since there is provided no partition wall separating the adjacent groups from each other.

As described above, according to the present invention, the gas molecules are introduced deep into the pump, and for example, the hydrogen gas molecules impinging on and reflected by the radiation-heat shield plate reach the cryopanel, disposed in opposed relation thereto, at an increased rate, thus enhancing the efficiency or rate of arresting the gas molecules. This can make the speed of exhaust of the gas about 25% higher as compared with the conventional cryopump.

Further, if the cryopanel is formed into a corrugated shape, an L-shape, a chevron shape or any other suitable shape, with the absorbents provided on a part of such cryopanel, those gases (such as helium gas) which cannot be exhausted by the bare surface of the cryopanel, can be exhausted without reducing the capacity for exhausting the hydrogen gas.

BRIEF DESCRIPTION OF THE DRAWINGS

FIGS. 10 to 16 are partly-broken, bird's eye views of further modified cryopumps, respectively, each showing a pair of radiation-heat shield plate and a cryopanel.

DESCRIPTION OF THE PREFERRED EMBODIMENTS OF THE INVENTION

The invention will now be described with reference to the drawings.

Figure 1:
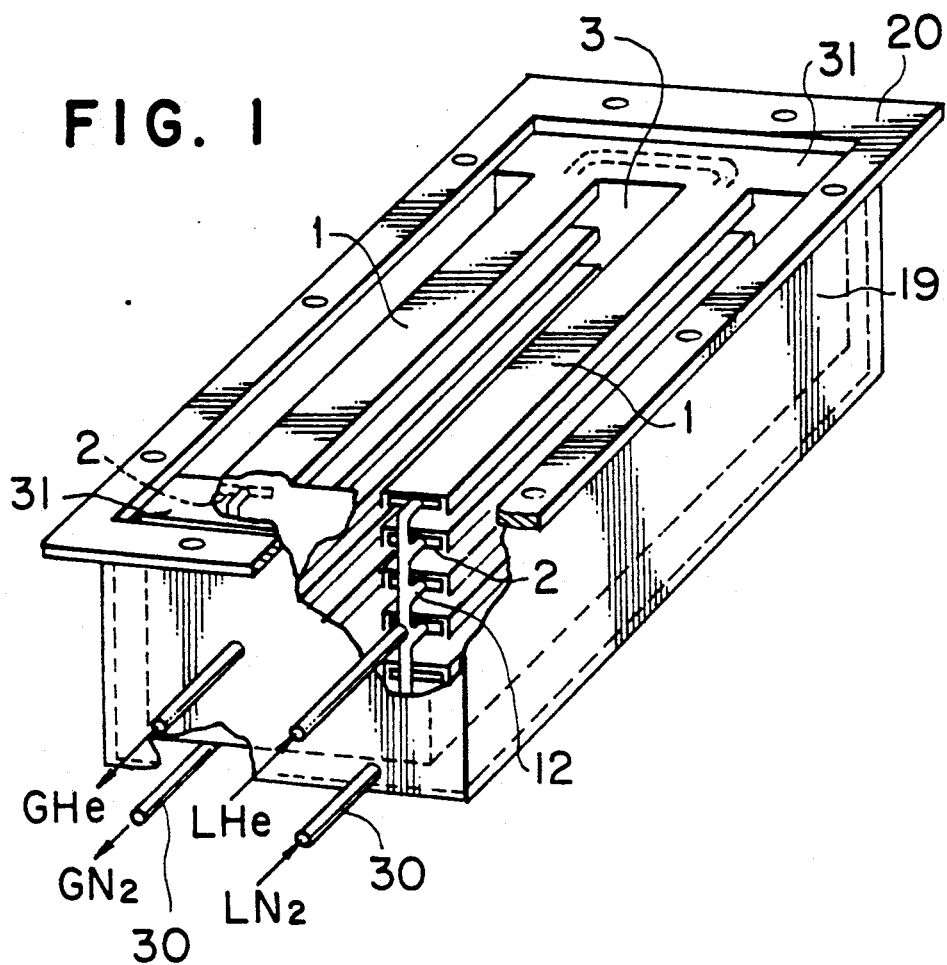
FIG. 1 is a partly-broken, perspective view of a cryopump provided in accordance with the present invention.

FIG. 1 is a perspective view of a preferred embodiment of a cryopump of the present invention.

The cryopump shown in FIG. 1 comprises a housing 19 having an opening which faces in the direction of flow of gas into the housing 19. An outwardly-directed flange 20 is formed on the peripheral edge of the housing 19 defining the opening. A plurality of groups of radiation-heat shield plates 1 are mounted within the housing 19, the radiation-heat shield plates in each group of radiation-heat shield plates 1 being arranged in a multi-stage manner in registry with one another to constitute a louver blind. Preferably, the number of the groups of radiation-heat shield plates 1 is one, two, or five or six, and the number of the stages of each group is twenty.

A cryopanel 2 is provided at the rear or reverse side of each radiation-heat shield plate 1. A liquid helium pipe 12 extends through each cryopanel 2. The liquid helium pipes 12 are joined together within the housing 19, and extend through the wall of the housing 19, and are connected to a helium freezing device (not shown).

Thus, the cryopanels 2 are supported within the housing 19 by the liquid helium pipes 12, respectively.

Each of the radiation-heat shield plates 1, constituting the louver, is connected at at least one end thereof to a wall 3 within the housing 19, and is supported by the wall 3. The wall 3 serves as an outer wall of a liquid nitrogen chamber 31 provided within the housing 19, and also serves as a radiation-heat shield plate which prevents the liquid helium pipes 12 from being exposed to the gas inlet. A liquid nitrogen pipe 30 is mounted in the wall of the housing 19 so that the temperature of the liquid nitrogen is transmitted to each radiation-heat shield plate 1. The housing 19 is of a heat-insulating construction.

Figure 2:
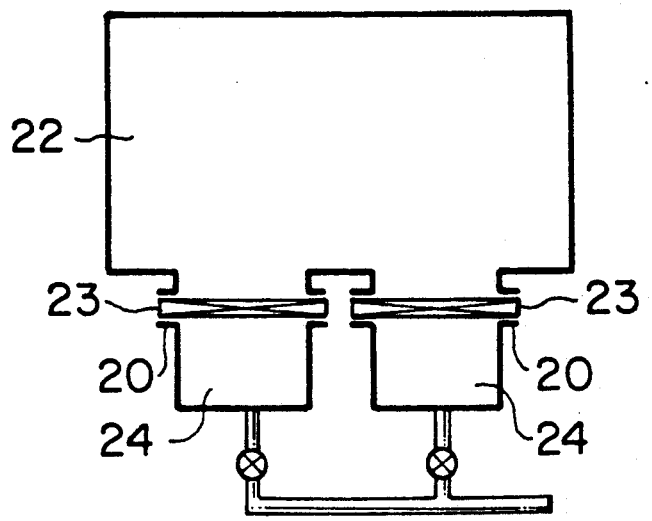
FIG. 2 is a schematic view showing a system incorporating the cryopumps of the present invention.

The cryopump of this construction is connected to a vacuum chamber. More specifically, as shown in FIG. 2, the cryopumps 24 are connected to the vacuum chamber 22 via respective gate valves 23. In this example shown in FIG. 2, the two cryopumps 24 are used, and during the time when one cryopump 24 effects the adsorbing operation, the other is regenerated.

Figure 3:
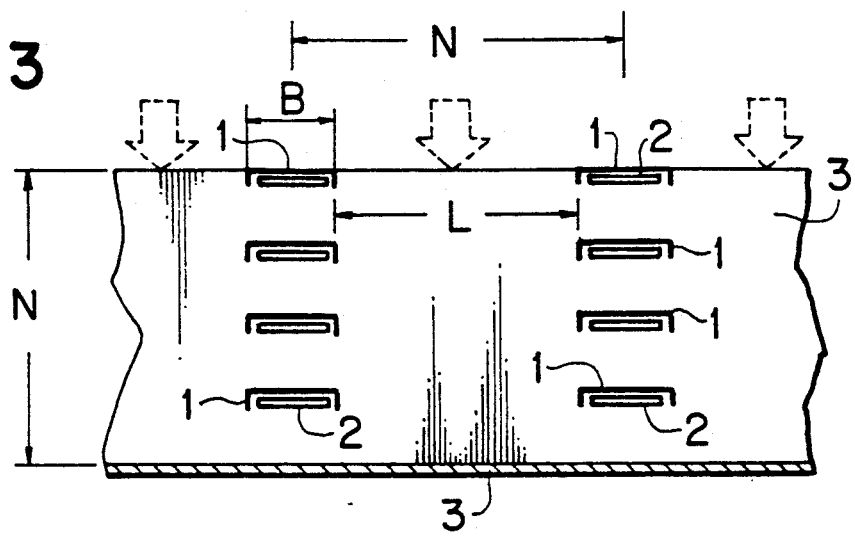
FIG. 3 is a cross-sectional view of a portion of a cryopump of the present invention, showing the arrangement of panels.
Figure 4:
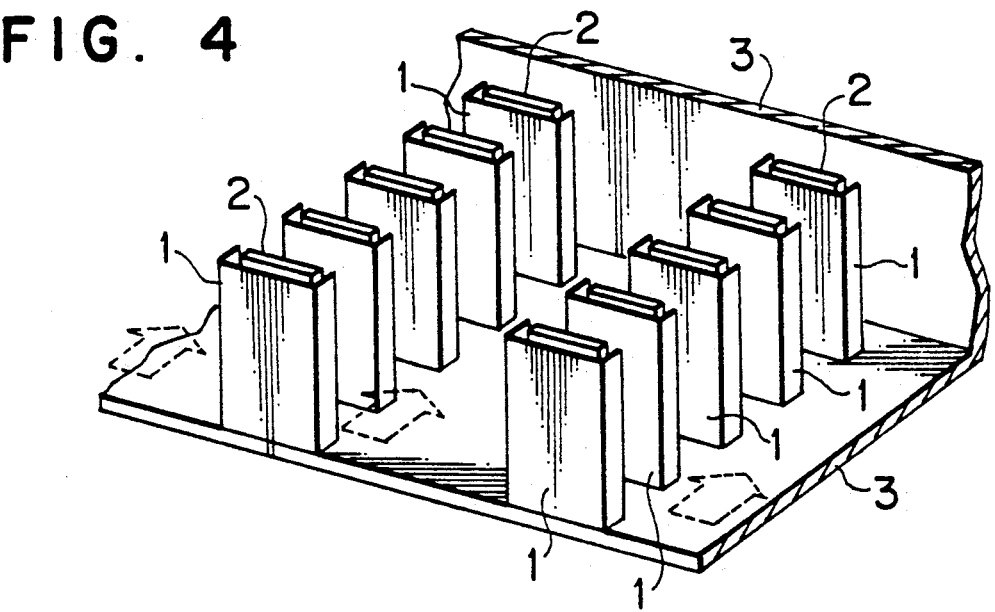
FIG. 4 is a bird's eye view of the arrangement of FIG. 3.

FIG. 3 is a cross-sectional view showing one example of the arrangement of cryopanels 2 and radiation-heat shield plates 1. FIG. 4 is a bird's eye view of this arrangement. The gas molecules to be exhausted flow into the cryopump through spaces or gaps each formed between two adjacent front radiation-heat shield plates 1, as indicated by broken-line arrows in FIG. 3. Each group of radiation-heat shield plates 1 are spaced a predetermined distance from one another in the direction of the depth of the cryopump and are disposed in registry with one another. The radiation-heat shield plate 1 is cooled to low temperature by liquid nitrogen or the like, and is maintained at a temperature of about 80K. The cryopanel 2 cooled to extremely low temperature by liquid helium or the like is provided at the reverse or rear side of each radiation-heat shield plate 1. The upper wall, the lower wall and the rear wall of the cryopump are constituted respectively by radiation-heat shield plates 3 cooled by liquid nitrogen or the like.

With respect to the radiation-heat shield plate 3 and all the radiation-heat shield plates 1 of each group except for the front radiation-heat shield plate 1, their surfaces directed toward the gas inlet of the cryopump are treated to have a black color, so that the thus treated surfaces can achieve an enhanced radiation efficiency. The opposite side edge portions of the radiation-heat shield 1 are bent perpendicularly toward the cryopanel 2 so that the cryopanel 2 can not be viewed directly from the gas inlet, thereby preventing a high-temperature heat radiation from reaching the cryopanel 2. Thus, the cryopanel 2 is thermally protected against such heat radiation.

A comparison between the performances of the cryopump of this embodiment and the prior art cryopump of the louver blind-type are shown in TABLE 1 below.

TABLE 1

| | Present invention | Prior art |
|---|---|---|
| Depth D (mm) of cryopump | 300 | 300 |
| Opening length N (mm) | 400 | 400 |
| Width B (mm) of front shield | 80 | 100 |
| Net opening length L (mm) | 300 | 300 |
| Angle α of louver (°) | 0 | 30 |
| Number of louvers | 5 | 7 |
| Arresting rate (rate of condensation and absorption of molecules of influent gas on cryopanel) | 0.49 | 0.37 |
| Ratio (%) of arresting rate between present invention and prior art (The arresting rate of the prior art is represented by 100%) | 132 | 100 |

As is clear from TABLE 1, in the cryopump of the present invention in which each group of radiation-heat shield plates 1 (which are generally equal in width and disposed parallel to the plane of the gas inlet) are arranged in a multi-stage manner in the direction of the depth of the housing, the gas molecules can be introduced deeper into the cryopump, and the gas molecules reflected by the heat-radiation shield plate 1 can reach the cryopanel 2 of the preceding stage, disposed in opposed relation to this heat-radiation shield plate 1, at a higher rate. Therefore, advantageously, the efficiency of condensation and adsorption of the gas molecules on the cryopanel 2, that is, the arresting rate, is increased about 32% as compared with that achieved with the prior art.

Figure 5:
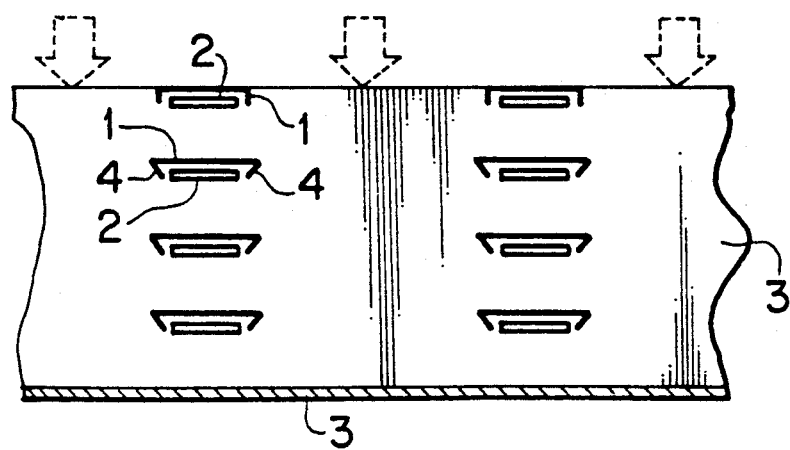
FIGS. 5 to 9 are views similar to FIG. 3, and showing modified cryopumps, respectively.

FIG. 5 shows a modified form of the invention. This embodiment differs from the preceding embodiment of FIG. 3 in that the opposite side edge portions 4 of each of the radiation-heat shield plates 1 of each group except for the front radiation-heat shield plate 1 are bent toward the cryopanel 2 into an angle of more than 90°. In this embodiment, when the gas molecules impinge on and are reflected by the bent side edge portions 4, the thus reflected gas molecules are directed toward the rear side of the pump remote from the gas inlet at a higher rate, thus reducing the probability of the gas molecules flowing out of the gas inlet. Therefore, the gas molecule arresting rate is further increased.

Figure 6:
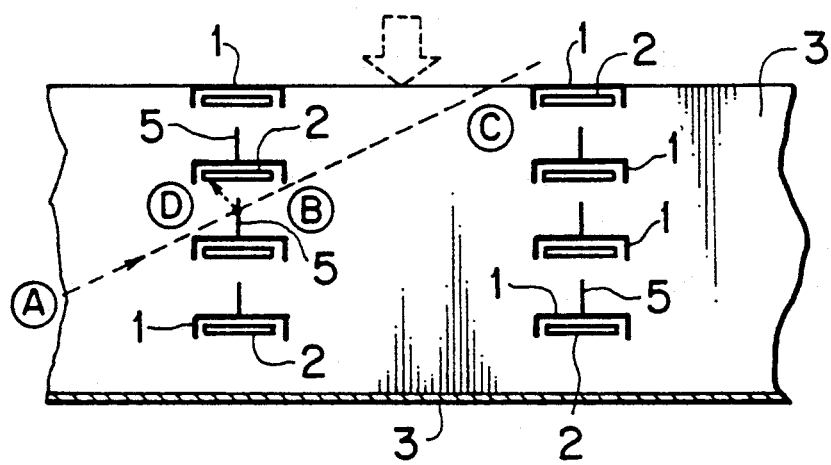

FIG. 6 shows another modified form of the invention. This embodiment differs from the embodiment of FIG. 3 in that a screen plate 5 of a low temperature is mounted on each of the radiation-heat shield plates 1 of each group except for the front radiation-heat shield plate 1, the screen plate 5 also serving as a radiation-heat shield plate. With this arrangement, the gas molecules, which otherwise would move from a rear side point A of the pump toward the gas inlet C without the screen plate 5, is reflected by the screen plate 5 at a point B, so that the probability of condensation and adsorption of the gas molecules on the cryopanel 2 at a point D is increased, thus further increasing the molecule arresting rate.

Figure 7:
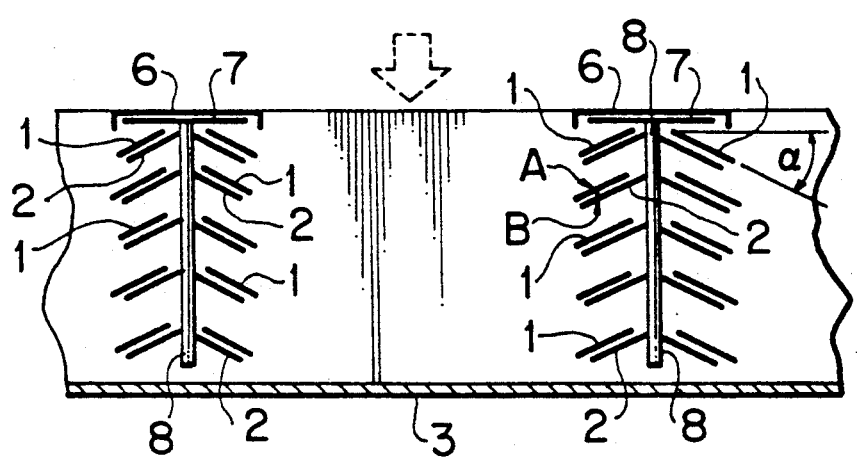

FIG. 7 shows a further modified form of the invention. In this embodiment, gas molecules to be exhausted flow into the cryopump through spaces each formed between two adjacent front radiation-heat shield plates 6 of a low temperature, as indicated in a broken-line arrow, each front radiation-heat shield plate 6 being provided at the front of the cryopump. A cryopanel 8 of an extremely low temperature is provided at the rear side of each front radiation-heat shield plate 6, and is disposed substantially perpendicular to the plane of the gas inlet of the cryopump. A group of louvers 1, constituted by radiation-heat shield plates of a low temperature, are provided on each side of the cryopanel 8, each louver 1 being inclined at an angle α with respect to the plane of the gas inlet. Cryopanels 2 are thermally integrally connected to the opposite sides of the cryopanel 8 so that the cryopanels 2 can be cooled to extremely low temperatures, each cryopanels 2 being inclined at an angle α and disposed in parallel opposed, closely spaced relation to the rear surface B of its mating louver 1 facing away from the gas inlet. A cryopanel 7 is integrally connected to the cryopanel 8 and is provided in parallel opposed, closed spaced relation to the rear side of each front radiation-heat shield plate 6. A rear wall 3 of the housing serves as a rear radiation-heat shield plate.

The cryopanel 8, the cryopanels 2 and the cryopanel 7 are so arranged that they cannot be viewed directly from the gas inlet of the cryopump. The gas molecules flowing into the cryopump through the gas inlet repeatedly impinge on the louvers (radiation-heat shield plates) 1 and the rear radiation-heat shield plate 3. At this time, a little gas molecules flow out of the cryopump directly through the gas inlet, after impinging on the rear radiation-heat shield plate 3 or the front surface A of the louver 1. However, because of the provision of the cryopanels 2, 7 and 8, the gas molecules, which conventionaly would impinge on and be reflected by the rear surface B of the louver and the rear surface of the front radiation-heat shield plate, can be positively condensed and adsorbed on the screen plates 2 and 7, thereby reducing the rate of the effluent gas. Therefore, in this embodiment, the speed of exhaust of the gas can be made higher than that achieved with the conventional cryopump of the louver type.

Figure 8:
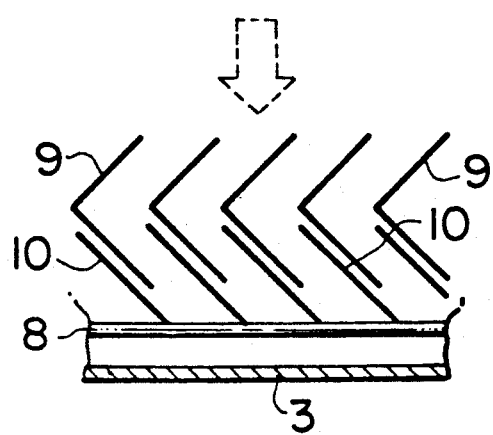

FIG. 8 shows a still further modified form of the invention. In this embodiment, a cryopanel 8 is protected from an external radiation heat by radiation-heat shield plates 9 of a chevron shape provided adjacent to the gas inlet through which the gas flows into the cryopump as indicated by a broken-line arrow. Cryopanels 10 are integrally formed with the cryopanel 8, and are disposed respectively at the rear sides of bent portions of the radiation-heat shield plate 9.

In this embodiment, also, the gas molecules, which would conventionally be reflected by the bent portions to flow back toward and through the gas inlet, can be positively exhausted by the cryopanels 10. Therefore, the exhaust speed can be higher with the cryopump of this embodiment than with the conventional cryopump of the chevron type. The cryopump of this embodiment is advantageous over the louver blind-type cryopump of FIG. 7 in that the depth of the cryopump can be made smaller.

Figure 9:
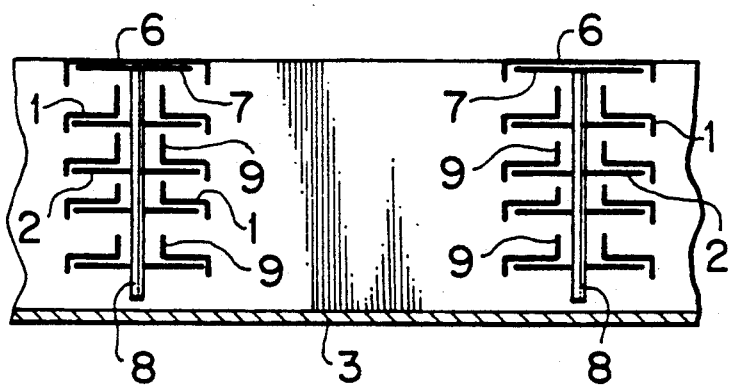

FIG. 9 shows a further modified form of the invention. This embodiment differs from the embodiment of FIG. 7 in that the angle o of inclination of each louver 1 with respect to the plane of a gas inlet is substantially zero, with a cryopanel 2 disposed at the rear side of each louver 1 in parallel relation thereto, and in that a radiation-heat shield plate 9 is integrally connected to one lateral edge of each louver 1 disposed close to the cryopanel 8. The cryopanel 8 is protected against the heat by the radiation-heat shield plates 9. In this embodiment, since the angle α of inclination of the louver 1 is substantially zero the gas molecules impinging on the louver 1 can advantageously reach the cryopanels 2 either directly or via the radiation-heat shield plate 9 at a higher rate than in the embodiment of FIG. 7.

Figure 10:
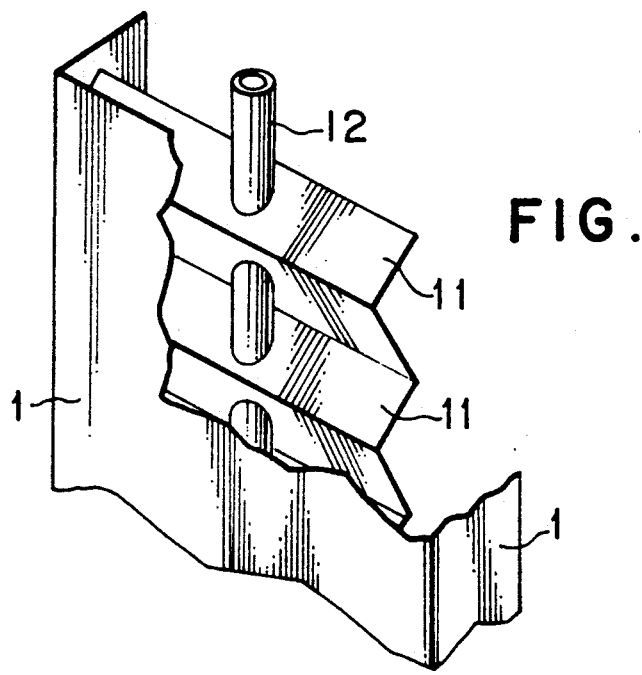

FIG. 10 shows a further modified form of the invention. This embodiment differs from the above-mentioned embodiments in that each cryopanel comprises a panel 11 which is of a corrugated shape and has a good heat conductivity. The cryopanel 11 is made integral with a liquid helium pipe 12 through their contact portions. In this embodiment, the cryopanel 11 has an increased surface area, and therefore if the maximum amount of gas condensation and absorption per unit area is constant, a larger amount of gas molecules can be condensed, so that the gas exhaust capacity can be increased. Therefore, the cryopump can be continuously operated for a longer period of time.

Figure 11:
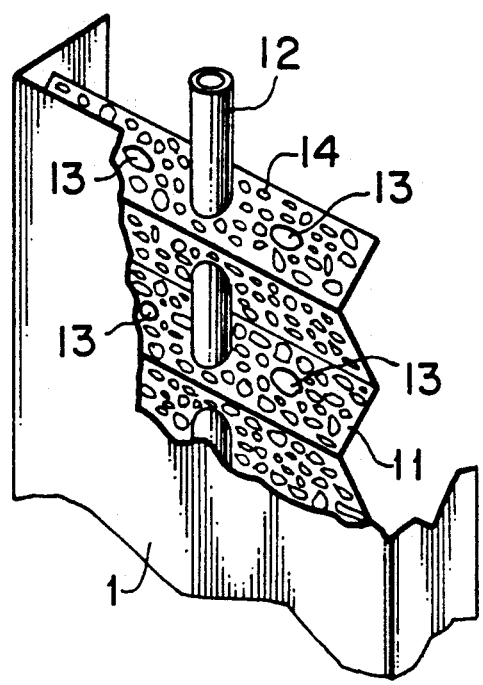

FIG. 11 shows a further modified form of the invention. This embodiment differs from the embodiment of FIG. 10 in that holes 13 are formed through the cryopanel 11 and in that an adsorbent 14, such as activated charcoal, is thermally integrally secured to one surface of the cryopanel 11 facing the radiation-heat shield plate 1. In this embodiment, advantageously, the molecules of a gas, such as helium gas, which cannot be condensed and adsorbed directly on the surface of the cryopanel, are allowed to pass through the holes 13, and then are reflected by the radiation-heat shield plate, and then are caused to impinge on the adsorbent 14, so that these gas molecules are adsorbed and exhausted.

Figure 12:
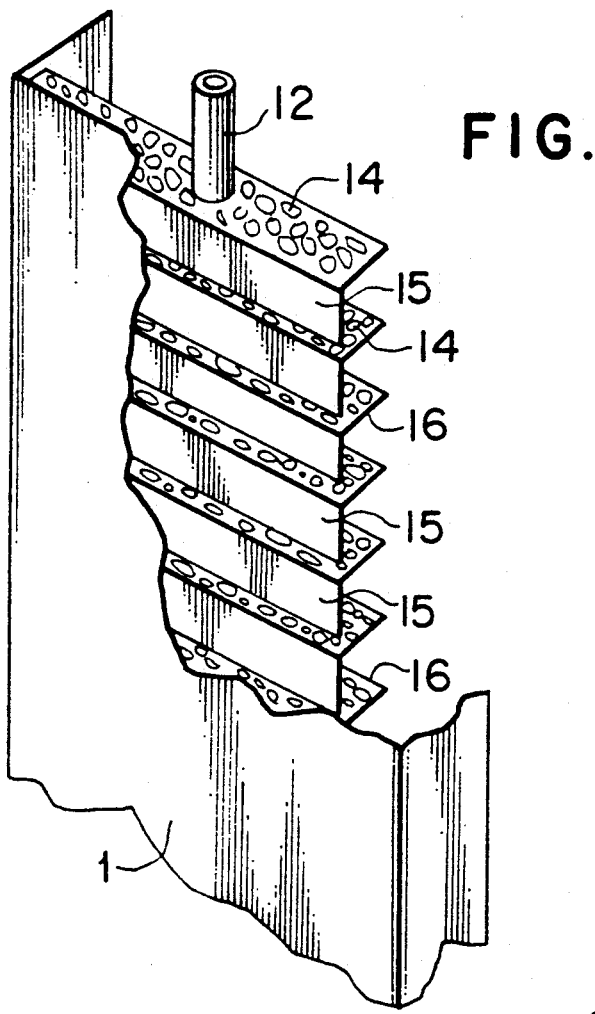

FIG. 12 shows a further modified form of the invention. This embodiment differs from the embodiment of FIG. 11 in that a cryopanel 15 comprises a plurality of L-shaped panel segments of a good heat conductivity and in that an adsorbent 14 is thermally integrally secured to the upwardly-directed surface of each panel segment. In this embodiment, those parts of the helium gas, which have not been adsorbed on the inner surface 16 of the L-shaped panel segment and hence have been reflected thereby, reach the adsorbent 14 and is exhausted. In the embodiment of FIG. 11, only those parts of the helium gas that have passed through the holes 13 can be exhausted, and therefore the efficiency of arresting the helium gas is not so high. In this embodiment, however, the helium gas can reach the adsorbent 14 directly or via the inner surface 16 at a higher rate, thus enhancing the helium gas arresting efficiency to increase the speed of exhaust of the helium gas. The speed of exhaust of the helium gas can be easily reduced by decreasing the area on which the adsorbent 14 is provided.

Figure 13:
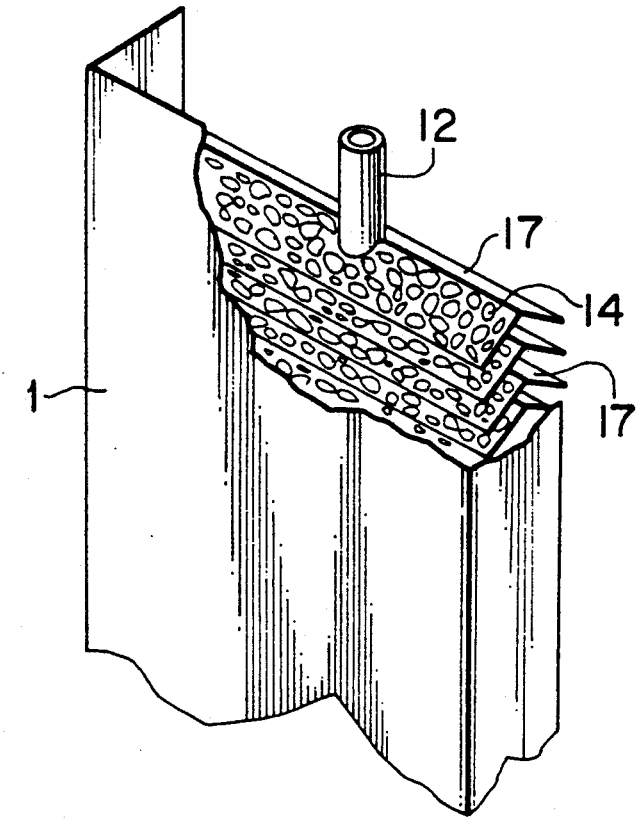

FIG. 13 shows a further modified form of the invention. This embodiment differs from the embodiment of FIG. 12 in that a cryopanel comprises a plurality of chevron-shaped panel segments 17 and that an adsorbent 14 is thermally integrally secured to that surface of each panel segment 17 disposed close to a radiation-heat shield plate 1. In this embodiment, when the cryopanel is viewed from the side opposite to the radiation-heat shield plate 1, the absorbent 14 is not seen directly. With this arrangement, those gases which can be exhausted directly by the surface of the cryopanel, such as nitrogen gas, hydrogen gas and tritium gas which are present in larger amount than helium gas, will not be adsorbed by the adsorbent 14, and hence the adsorption of the adsorbent 14 is not saturated by those gases in a short time. Therefore, the adsorbent 14 mainly adsorbs the helium gas, and can maintain its exhaust effect for a long period of time.

FIG. 14 shows a further modified form of the invention. This embodiment differs from the embodiment of FIG. 13 in that a cryopanel comprises a plurality of louver-like segments 18 cooled by a liquid helium pipe 12, and that a panel 26 cooled by a liquid helium pipe 25 is interposed between a radiation-heat shield plate 1 and the plurality of segments 18, and that an adsorbent 14 is thermally integrally secured to that surface of the panel 26 facing the segments 18. In this embodiment, since the adsorbent 14 is not held on the cryopanel but on the separate panel 26, the condensation and adsorbent surface of the cryopanel is not reduced. Therefore, advantageously, without reducing the speed of exhaust of hydrogen gas and other gases, the gaseous helium can be arrested at a higher rate than with the chevron-type cryopump, thus increasing the speed of exhaust of the gaseous helium. In this embodiment, the panel 26 integrally holding the absorbent 14 can be easily exchanged independently of the cryopanel.

FIG. 15 shows a further modified form of the invention. This embodiment differs from the embodiment of FIG. 12 in that a plurality of recesses 27 are formed in an upwardly-directed surface of a cryopanel segment 15 and that pellet-like absorbent elements 28 are embedded respectively in the recesses 27 and are thermally integrally connected thereto. The recesses 27 are drawn out of the plane of the cryopanel segment. In this embodiment, since each adsorbent element 28 is received deep in the recess 27 and is fixed thereto by an epoxy resin-type adhesive or the like, the adsorbent element 28 advantageously will not become disengaged from the cryopanel segment 15 even when the cryopanel segment is repeatedly subjected to a thermal cycle such as the cooling-down and warming-up. The recesses 27 may be replaced by a suitable number of continuous grooves in which case the same effects can be achieved. In this case, the area of the downwardly-directed surface of the cryopanel segment 15 is increased, and this advantageously increases the capacity for exhaust of hydrogen gas condensed and absorbed on, this downwardly-directed surface.

FIG. 16 shows a further modified form of the invention. This embodiment differs from the embodiment of FIG. 10 in that a cryopanel 29 is in the form of spaced-apart panel segments and that a cooling pipe 12 is made of a material having a high electric resistance, such as stainless steel while the cryopanel 29 is made of a material of a small electric resistance, such as copper and aluminum. Therefore, in this embodiment, an eddy current due to a fluctuation in an external magnetic field is produced in the cryopanel 29. However, such eddy current and hence Joule heat are small since the cryopanel segments 29 of a small electric resistance, in which an eddy current tends to develop, are separated from one another. Therefore, the liquid helium flowing through the cooling pipe 12 is prevented from being subjected to an increased thermal load. In this case, if a radiation-heat shield plate 1 for protecting the cryopanel is made of copper or aluminum, a Joule heat loss due to the eddy current can be adsorbed by liquid nitrogen cooling the radiation-heat shield plate 1, so that the cryopanel is protected from the eddy current. As a result, the thermal load on the liquid helium can be further reduced, thereby further reducing the evaporation of the liquid helium.

What is claimed is:

1. A cryopump comprising:
    a housing having a gas inlet and a gas outlet,
    a plurality of columns of cryopanels arranged substantially in parallel with said gas inlet and housed in said housing, said plurality of cryopanels having substantially the same width,
    means for cooling said plurality of cryopanels at extremely low temperature,
    a plurality of radiation-heat shield plates arranged substantially in parallel with said gas inlet and housed in said housing, said plurality of radiation-heat shield plates having substantially the same width and having both end portions bent opposite to said gas inlet at an angle of at least 90°, said plurality of radiation-heat shield plates being disposed in front of said cryopanels, respectively and
    means for cooling said plurality of radiation-heat shield plates at low temperature.

2. A cryopump according to claim 1, wherein said plurality of radiation-heat shield plates comprise first shield plates disposed in a front row of said columns and second shield plated disposed there behind, said first shield plates having both end portions bent opposite to said gas inlet at an angle of 90° and said second shield plates having both end portions bent opposite to said gas inlet at an angle greater than 90° toward the respective cryopanels.

3. A cryopump according to claim 2, wherein said plurality of cryopanels are formed in a form of a corrugation.

4. A cryopump according to claim 3, wherein said plurality of cryopanels have through holes and adsorbents bonded on surfaces facing respective radiation-heat shield plates.

5. A cryopump according to claim 2, wherein each of said plurality of cryopanels comprises a plurality of panel members spaced apart from each other and a pipe passing through said panel members, said pipe having an electric resistance greater than that of said panel members.

6. A cryopump according to claim 2, wherein each of said plurality of cryopanels comprises a plurality of L-shaped panel members spaced apart from each other and a pipe passing through upwardly facing surfaces of said plurality of L-shaped panel members, said upwardly facing surfaces having adsorbents bonded thereon.

7. A cryopump according to claim 6, wherein said upwardly facing surfaces include recesses in which the adsorbents are bonded.

8. A cryopump according to claim 2, wherein each of said plurality of cryopanels comprises a plurality of chevron-shaped panel members spaced apart from each other and a pipe passing through said plurality of chevron-shaped panel members, surfaces of said panel members facing towards the radiation-heat shield plate having adsorbents bonded thereon.

9. A cryopump according to claim 1, wherein said plurality of radiation-heat shield plates comprises first shield plates disposed in the front row of said columns and second shield plates disposed therebehind, said second shield plates having plate portions extending toward said gas inlet.

10. A cryopump according to claim 9, wherein aid plurality of cryopanels are formed in a form of a corrugation.

11. A cryopump according to claim 10, wherein said plurality of cryopanels have through holes and adsorbents bonded on surfaces facing respective radiation-heat shield plates.

12. A cryopump according to claim 9, wherein each of said plurality of cryopanels comprises a plurality of panel members spaced apart from each other and a pipe passing through said panel members, said pipe having an electric resistance greater than that of said panel members.

13. A cryopump according to claim 9, wherein each of said plurality of cryopanels comprises a plurality of L-shaped panel members spaced apart from each other and a pipe passing through upwardly facing surfaces of said plurality of L-shaped panel members, said upwardly facing surfaces having adsorbents bonded thereon.

14. A cryopump according to claim 13, wherein said upwardly facing surfaces include recesses in which the adsorbents are bonded.

15. A cryopump according to claim 9, wherein each of said plurality of cryopanels comprises a plurality of chevron-shaped panel members spaced apart from each other and a pipe passing through said plurality of chevron-shaped panel members, surfaces of said panel members facing towards the radiation-heat shield plate having adsorbents bonded thereon.

16. A cryopump according to claim 1, wherein said plurality of cryopanels are in a form of corrugation.

17. A cryopump according to claim 16, wherein said plurality of cryopanels have through holes and adsorbents bonded on surfaces facing respective radiation-heat shield plates.

18. A cryopump according to claim 1, wherein each of said plurality of cryopanels comprises a plurality of panel members spaced apart from each other and a pipe passing through said panel members, said pipe having an electric resistance greater than that of said panel members.

19. A cryopump according to claim 1, wherein each of said plurality of cryopanels comprises a plurality of L-shaped panel members spaced apart from each other and a pipe passing through upwardly facing surfaces of said plurality of L-shaped panel members, said upwardly facing surfaces having adsorbents bonded thereon.

20. A cryopump according to claim 19, wherein said upwardly facing surfaces include recesses in which the adsorbents are bonded.

21. A cryopump according to claim 1, wherein each of said plurality of cryopanels comprises a plurality of chevron-shaped panel members spaced apart from each other and a pipe passing through said plurality of chevron-shaped panel members, surfaces of said panel members facing towards the radiation-heat shield plate having adsorbents bonded thereon.

22. A cryopump comprising:
a housing having a gas inlet and a gas outlet,
a plurality of cryopanels each of which comprises a first cryopanel portion disposed substantially in parallel with said gas inlet, a second cryopanel portion extending from a back surface of said first cryopanel portion in a direction perpendicular to said gas inlet and a plurality of third cryopanel portions extending from both surfaces of said second cryopanel portion with a predetermined angle with respect to said gas inlet, said plurality of cryopanels being arranged in a row in said housing,
means for cooling said plurality of cryopanels at extremely low temperature,
a plurality of first radiation-heat shield plates arranged substantially in parallel with said gas inlet in front of said first cryopanel portions, respectively, said first shield plates having substantially the same width and having both end portions bent opposite to said gas inlet at an angle of 90°,
a plurality of second radiation-heat shield plates disposed in front of and substantially in parallel with said plurality of third cryopanel portions, respectively, and
means for cooling said plurality of first and second radiation-heat shield plates at low temperature.

23. A cryopump according to claim 22, wherein said predetermined angle with respect to said gas inlet is zero and said radiation-heat shield plates have both end portions being in opposite directions.

24. A cryopump comprising:
a housing having a gas inlet and a gas outlet,
a plurality of radiation-heat shield plates housed in said housing, each of said shield plates having a chevron shape and arranged substantially in parallel with said gas inlet with one side thereof facing said gas inlet and an opposite side,
means for cooling said plurality of chevron-shaped radiation-heat shield at low temperature,
a cryopanel housed in said housing and comprising a main cryopanel disposed substantially in parallel with said gas inlet and behind said plurality of radiation-heat shield plates and a plurality of cryopanel portions extending from a side of said main cryopanel and disposed behind the other side of said plurality of radiation-heat shield plates, respectively, and
means for cooling said cryopanel at extremely low temperatures.

* * * * *